United States Patent
Park et al.

(10) Patent No.: US 7,889,626 B2
(45) Date of Patent: Feb. 15, 2011

(54) MICRO ACTUATOR AND DATA STORAGE APPARATUS EMPLOYING THE SAME

(75) Inventors: Hong-sik Park, Seoul (KR);
Seung-bum Hong, Seongnam-si (KR);
Dong-ki Min, Seoul (KR); Jong-youp Shim, Incheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1107 days.

(21) Appl. No.: 11/607,957

(22) Filed: Dec. 4, 2006

(65) Prior Publication Data

US 2007/0153430 A1    Jul. 5, 2007

(30) Foreign Application Priority Data

Jan. 4, 2006    (KR) ............... 10-2006-0000887

(51) Int. Cl.
*G11B 9/02*    (2006.01)
(52) U.S. Cl. ............................ 369/126; 977/947
(58) Field of Classification Search .................. None
See application file for complete search history.

(56) References Cited

U.S. PATENT DOCUMENTS

| | | | | |
|---|---|---|---|---|
| 5,313,451 A | * | 5/1994 | Yagi et al. ................. | 369/126 |
| 5,412,597 A | * | 5/1995 | Miyazaki et al. .......... | 369/126 |
| 5,680,387 A | * | 10/1997 | Yamano et al. ............ | 369/126 |
| 6,072,764 A | * | 6/2000 | Shido et al. ............... | 369/126 |
| 6,459,088 B1 | * | 10/2002 | Yasuda et al. ........ | 250/442.11 |
| 6,735,163 B2 | * | 5/2004 | Marshall ................... | 369/126 |
| 7,466,644 B2 | * | 12/2008 | Min et al. .................. | 369/126 |
| 7,514,942 B2 | * | 4/2009 | Rao ........................... | 324/754 |
| 2003/0210640 A1 | * | 11/2003 | Min et al. .................. | 369/126 |
| 2007/0030791 A1 | * | 2/2007 | Hasebe et al. ............. | 369/126 |
| 2007/0153430 A1 | * | 7/2007 | Park et al. ............... | 360/294.4 |

FOREIGN PATENT DOCUMENTS

JP    5-314549 A    11/1993

* cited by examiner

*Primary Examiner*—Peter Vincent Agustin
(74) *Attorney, Agent, or Firm*—Sughrue Mion, PLLC

(57) ABSTRACT

A micro actuator having separated stages and a data storage apparatus employing the same are provided. The micro actuator includes: a supporting unit; stages that are elastically supported by the supporting unit, each stage having a mounting surface where a target driven body is mounted thereon, and arranged adjacent to each other; levers which are disposed between the stages, each lever having two ends respectively connected to adjacent stages, and which apply force to the adjacent stages so that when one of the stages is moved, an adjacent stage is moved in an opposite direction to a moving direction of the moved stage; and driving units which respectively provide a driving force to the stages.

14 Claims, 14 Drawing Sheets

MICRO ACTUATOR AND DATA STORAGE APPARATUS EMPLOYING THE SAME

CROSS-REFERENCE TO RELATED PATENT APPLICATION

This application claims priority from Korean Patent Application No. 10-2006-0000887, filed on Jan. 4, 2006, in the Korean Intellectual Property Office, the disclosure of which is incorporated herein in its entirety by reference.

BACKGROUND OF THE INVENTION

1. Field of the Invention

The present invention relates to an electromagnetic driving micro actuator used in a data storage system employing scanning probe microscopy (SPM) technology, and a micro actuator having a structure that can increase the storage capacity of a data storage system by improving an area efficiency of a media stage, thereby reducing manufacturing costs.

2. Description of the Related Art

A typical data storage system employing scanning probe microscopy (SPM) technology includes a data storage medium mounted on a stage, a micro actuator for driving the data storage medium in x and y directions, one or more probes each having a tip for reading and recording data from and to the data storage medium, and a signal process unit for processing data signals.

In order to drive the micro actuator in at least two directions, for example the x and y directions, driving units each driving in the x or y direction are separately arranged on two sides of the stage. Being that the driving units have the same weight as the stage, the structure can strongly endure external impact.

However, since the driving units are separated from the stage, the entire volume of the micro actuator increases. Accordingly, when the micro actuator is fabricated using thin film fabricating processes, the number of devices fabricated in a single silicon wafer decreases, and thus manufacturing costs thereof increase. In addition, since a coil is installed in each of the driving units, the weight of coils may vary, and the devices may perform differently from each other.

SUMMARY OF THE INVENTION

An aspect of the present invention provides a micro actuator having a structure capable of high area efficiency and endurance against external shocks and a data storage apparatus employing the same.

According to an aspect of the present invention, there is provided a micro actuator including: a supporting unit; a plurality of stages that are elastically supported by the supporting unit, each stage having a mounting surface where a target driven body is mounted thereon, and arranged adjacent to each other; a plurality of levers which are disposed between the plurality of stages, each lever having two ends respectively connected to adjacent stages, and which apply force to the adjacent stages so that when one of the stages is moved, an adjacent stage is moved in an opposite direction to a moving direction of the stage; and driving units which respectively provide a driving force to the stages.

According to another aspect of the present invention, there is provided a data storage apparatus comprising: media which store data; a micro actuator in which the media is mounted wherein the micro actuator includes a supporting unit, four stages which are elastically supported by the supporting unit, and are arranged adjacent to each other and in a two-by-two matrix in a first direction and a second direction perpendicular to the first direction, a plurality of levers which are disposed between the four stages, each lever having two ends respectively connected to adjacent stages, and which apply force to the adjacent stages so that when one of the stages is moved, an adjacent stage is moved in an opposite direction to a moving direction of the moved stage, and driving units which respectively provide a driving force to the stages; and a cantilever tip array arranged in an upper portion of the media in order to store data in the media or read data from the media.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

Figure 1:
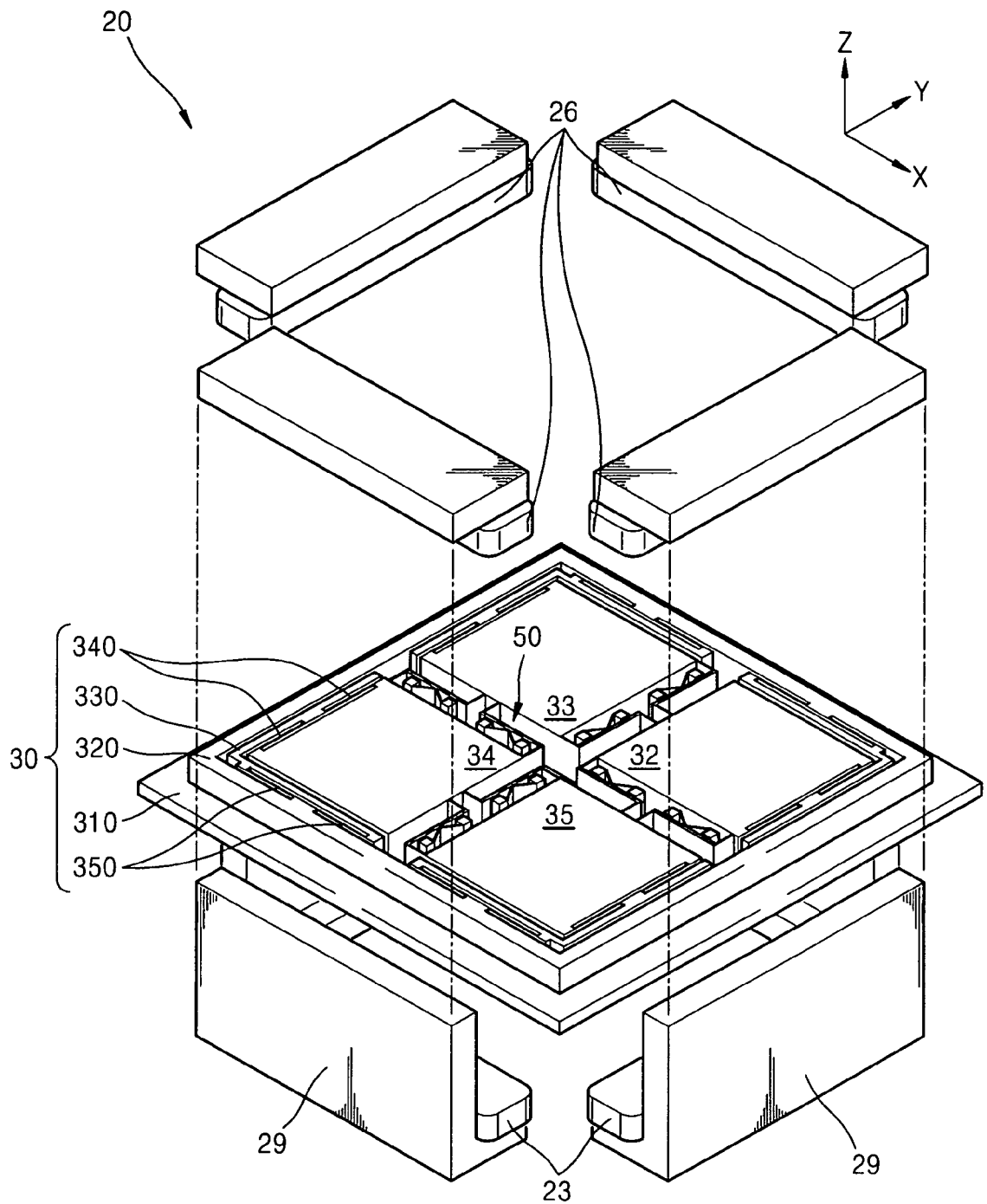
FIG. 1 is a perspective view of a micro actuator according to an exemplary embodiment of the present invention.
Figure 2:
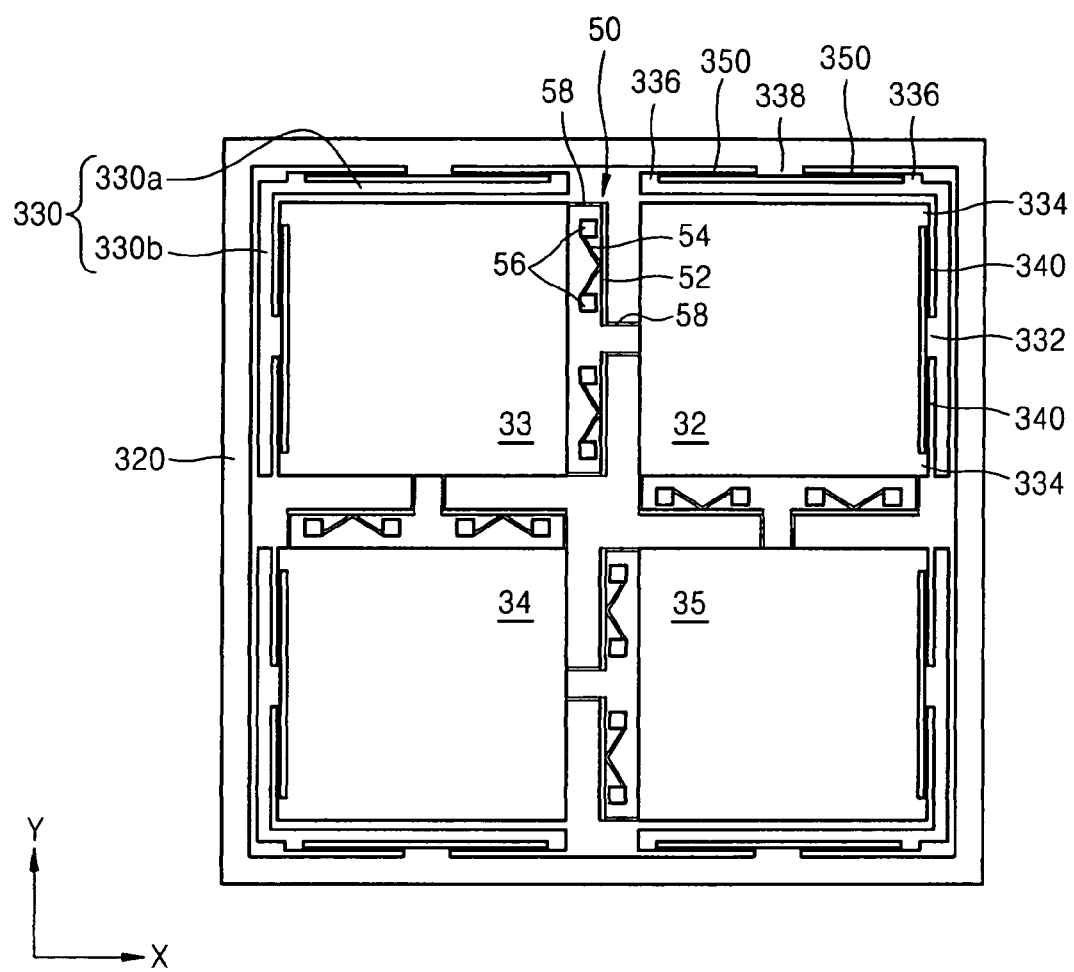
FIG. 2 is a plan view of a plurality of stages of the micro actuator of FIG. 1 according to an exemplary embodiment of the present invention.

FIG. 1 is a perspective view of a micro actuator 20 according to an exemplary embodiment of the present invention. FIG. 2 is a plan view of first through fourth stages 32 through 35 of the micro actuator 20 of FIG. 1 according to an exemplary embodiment of the present invention.

Referring to FIGS. 1 and 2, the micro actuator 20 includes a supporting unit 30, the first through fourth stages 32 through 35 which are elastically supported by the supporting unit 30 and on which a target driven body (not illustrated) is mounted, a plurality of levers 50 connecting adjacent stages among the first through fourth stages 32 through 35, a driving unit which drives the first through fourth stages 32 through 35 and includes four pairs of permanent magnets 23 and 26 and a plurality of yokes 29 forming a closed loop magnetic filed induced by the permanent magnets 23 and 26.

The supporting unit 30 includes a base 310; a frame 320 which is disposed on the base 310 and surrounds the first through fourth stages 32 through 35; a plurality of stiffeners 330 which are disposed between the frame 320 and each of the first through fourth stages 32 through 35 and move in one of x and y directions according to a principle to be described later; and elastic beams 340 and 350 disposed between the frame 320 and the first through fourth stages 32 through 35 and between the stiffeners 330 and the first through fourth stages 32 through 35, and elastically supporting the four stages 32 through 35.

In FIGS. 1 and 2, the frame 320 has a rectangular shape surrounding the outsides of the four stages 32 through 35 connected to each other through the levers 50, but the present invention not limited to this shape.

The base 310 contacts the frame 320 and a plurality of fixing units 56 which fix the levers 50, and has predetermined shaped grooves so that the first through fourth stages 32 through 35 can move supported by the base 310, floating from the base 310.

The first through fourth stages 32 through 35 are arranged in a first direction, that is, an X direction, and a second direction, that is, a Y direction, perpendicular to the X direction. Moreover, the first through fourth stages 32 through 35 are arranged in a 2 by 2 matrix. Four stages are used in the current exemplary embodiment, but the present invention is not limited to this number of stages.

The stiffeners 330 are arranged between the frame 320 and each of the first through fourth stages 32 through 35. The stiffeners 330 extend along the X direction and the Y direction of the sides of the first through fourth stages 32 through 35 from four edges of the inside of the frame 320 to have an L-shape, and have a first region 330a parallel to the first direction and a second region 330b parallel to the second direction.

A first connecting unit 332 is respectively formed at the center of the side of the second region 330b in each stiffener 330 and protrudes toward the first through fourth stages 32 through 35. Second connecting units 334 are formed at both ends of sides of the first through fourth stages 32 through 35 disposed at the positions facing each other to protrude toward the second region 330b of each of the stiffeners 330. A first elastic beam 340 having X directional elasticity is formed to connect the first connecting unit 332 and the second connecting unit 334. The first elastic beam 340 moves the first through fourth stages 32 through 35 along the X direction according to the driving principle, which will be described later, using the permanent magnets 23 and 26, and coils 37X and 37Y (not shown in FIGS. 1 and 2).

Third connecting units 336 are formed at both ends of the sides of the first region 330a in each stiffener 330 to protrude toward the frame 320. In addition, a fourth connecting unit 338 is formed in the center of the side of the frame 320 disposed in the side facing to the third connecting units 336 to protrude toward the first region 330a of each of the stiffeners 330. A second elastic beam 350 is formed to connect the third connecting unit 336 and the fourth connecting unit 338. The second elastic beam 350 moves the first through fourth stages 32 through 35 along the Y direction according to the driving principle, which will be described later, using the permanent magnets 23 and 26, and the coils 37X and 37Y.

The levers 50 are arranged between opposing sides of the first through fourth stages 32 through 35. Each of the levers 50 includes a fixing unit 56 installed in the base 310, an operating unit 52 whose ends are connected to a facing side of the adjacent first through fourth stages 32 through 35, and a hinge unit 54 interposed between the fixing unit 56 and the operating unit 52 and rotatably supporting the operating unit 52.

The hinge unit 54 has a V-shape, an edge thereof connects the center of the operating unit 52, and two fixing units installed in the base 310 are connected to both ends of the hinge unit 54.

Connecting beams 58 having elasticity to move the operating unit 52 in X and Y directions are formed at a first end of the operating unit 52, extend to the sides of the first through fourth stages 32 through 35 adjacent to the operating unit 52, and are connected to the first through fourth stages 32 through 35. In addition, connecting beams 58 are formed at a second end of the operating unit 52, extend to the sides of the first through fourth stages 32 through 35 adjacent to the operating unit 52, and are connected to the first through fourth stages 32 through 35.

That is, the levers 50 are disposed between the first stage 32 and the second stage 33 and between the third stage 34 and the fourth stage 35 in the Y direction, which is a longitudinal direction of the operating unit 52, to move the first through fourth stages 32 through 35 in a positive or negative X direction.

In addition, the levers 50 are disposed between the first stage 32 and the fourth stage 35 and between the second stage 33 and the third stage 34 in the X direction, which is a longitudinal direction of the operating unit 52, to move the first through fourth stages 32 through 35 in a positive or negative Y direction. In the current exemplary embodiment of the present invention, two levers 50 are disposed between the first through fourth stages 32 through 35, but the present invention is not limited to this number. In addition, in the levers 50, the relative position of the fixing unit 56 or the connecting beam 58 to the operating unit 52 is not limited to the current position, and can be changed.

Figure 3:
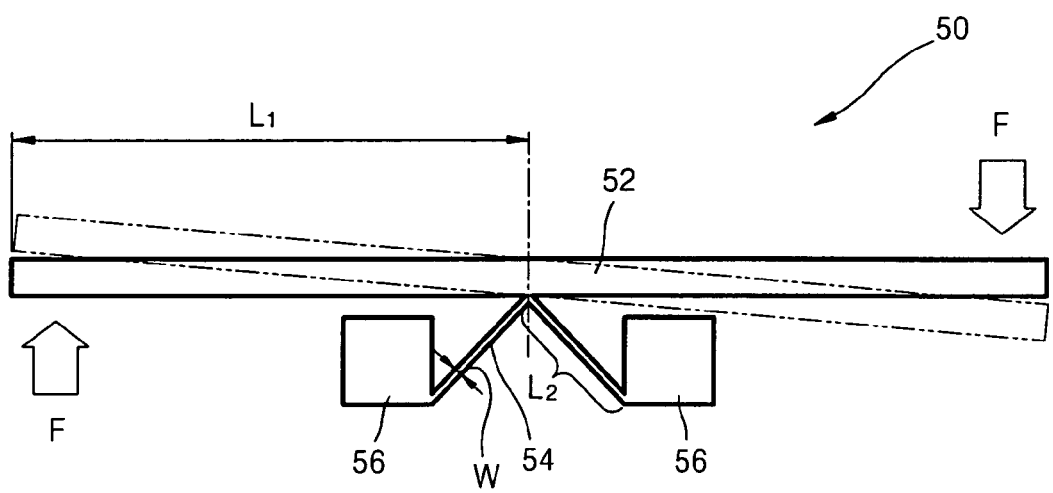
FIG. 3 is a schematic view illustrating an operation of levers in the micro actuator of FIG. 1 according to an exemplary embodiment of the present invention.

FIG. 3 is a schematic view illustrating an operation of the levers 50 connecting the first through fourth stages 32 through 35. Referring to FIG. 3, in the lever 50, the edge of the V-shaped hinge unit 54, is fixed at the center of the operating unit 52, and the lever 50 is supported by the fixing unit 56 disposed at both ends of the hinge unit 54. Accordingly, when a force is applied to a first end of the operating unit 52, a force having the same magnitude but an opposite direction is applied to a second end of the operating unit 52.

An equivalent elastic coefficient k corresponding to the lever 50 is as follows in Equation 1.

$$k = \frac{Etw^3}{6L_1^2 L_2} \qquad (1)$$

where $L_1$ is a distance from the center to a first end of the operating unit 52, $L_2$ is a distance from the angle to a first end of the hinge unit 54, w is a width of the hinge unit 54, t is a thickness of the lever 50 to the direction of out of page, and E is Young's modulus of the lever 50. When designing the lever 50, values of L1, L2, w, and t can be properly determined according to a relationship between the elastic beams 340 and 350.

Figure 4:
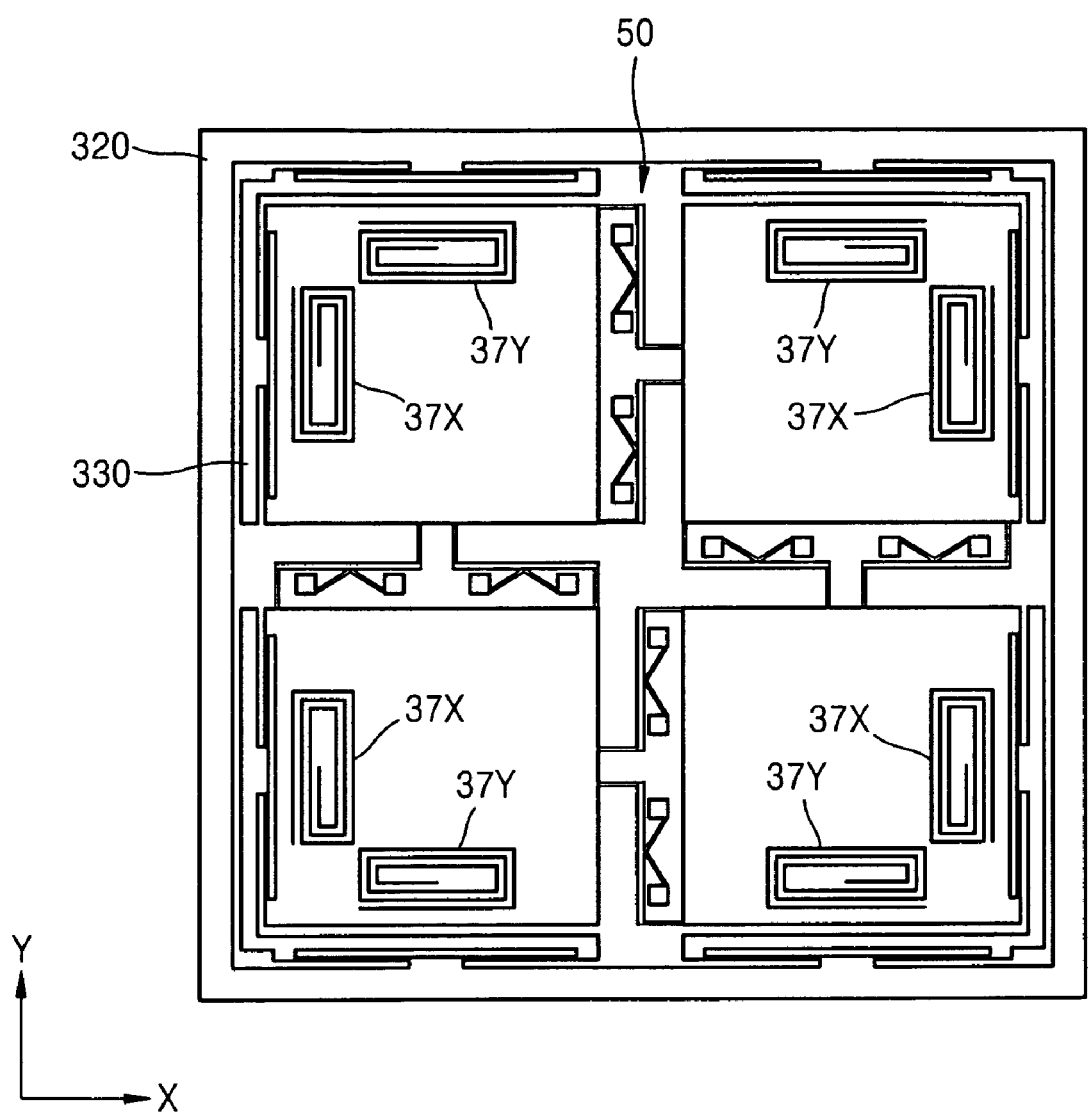
FIG. 4 is a bottom view of the stages of the micro actuator of FIG. 1, according to an exemplary embodiment of the present invention.
Figure 5:
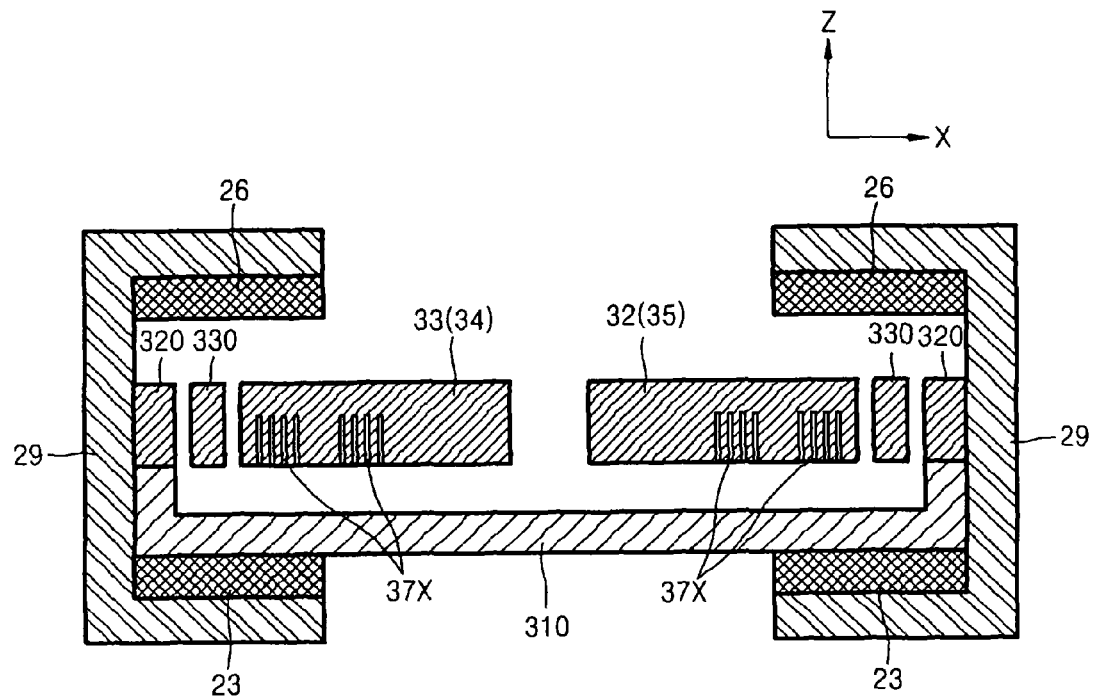
FIG. 5 is a cross-sectional view of the micro actuator of FIG. 1 according to an exemplary embodiment of the present invention.

FIG. 4 is a bottom view of the stages of the micro actuator 20 of FIG. 1 according to an exemplary embodiment of the present invention. FIG. 5 is a cross-sectional view of the micro actuator 20 of FIG. 1 according to an exemplary embodiment of the present invention.

Referring to FIGS. 4 and 5, an X-coil 37X providing a driving force in the X direction and a Y-coil 37Y providing a driving force in the Y direction are respectively arranged in the bottom surfaces of the first through fourth stages 32 through 35. An electrode pad for supplying a current to the coils 37X and 37Y is not illustrated, but is suitably arranged to connect to the frame 320.

A driving apparatus driving the first through fourth stages 32 through 35 in the X and Y directions includes the permanent magnets 23 and 26 and the X-coil 37X and the Y-coil 37Y. The X-coil 37X and the Y-coil 37Y are disposed between the permanent magnets 23 and 26, and the permanent magnets 23 and 26 are arranged so that a magnetic field is applied to affect half of the X-coil 37X and the Y-coil 37Y.

The X-coil 37X and the Y-coil 37Y may be disposed on top surfaces of the first through fourth stages 32 through 35. However, referring to FIGS. 4 and 5, the X-coil 37X and the Y-coil 37Y may be disposed on bottom surfaces of the first through fourth stages 32 through 35 so that the area in which a target driven body is mounted is larger.

Figure 6:
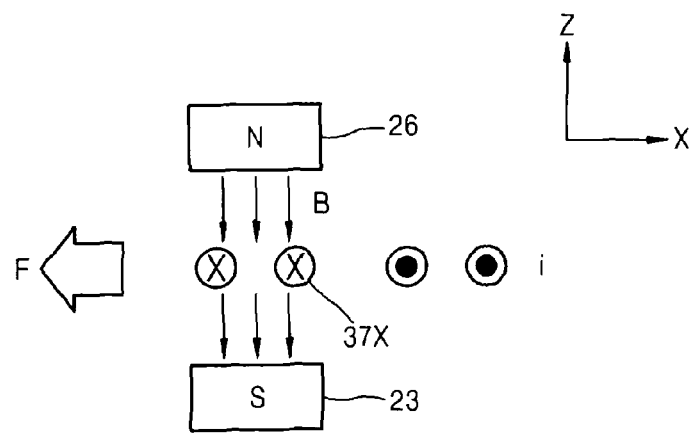
FIG. 6 is a schematic view illustrating a principle of operating the micro actuator of FIG. 1, according to an exemplary embodiment of the present invention.

FIG. 6 is a schematic view illustrating a principle of operating the micro actuator 20 of FIG. 1, according to an exemplary embodiment of the present invention. Referring to FIG. 6, when a current i is supplied to the X-coil 37X to generate a magnetic field B in the thickness direction Z of the first through fourth stages 32 through 35, a Lorentz force F, perpendicular to the current i and the magnetic field B respectively, is generated. That is, when a current flows in a positive Y direction, the X-coil 37X, which is in the magnetic field B of a negative Z direction is forced in a negative X direction. When a current flows in a negative Y direction, the X-coil 37X is forced in a positive X direction.

The X-coil 37X in the X-Z cross-section is illustrated in FIG. 6, but the Y-coil 37Y in the Y-Z cross-section is also forced in a positive or negative Y direction according to the current direction, and thus the first through fourth stages 32 through 35 move in the X and Y directions.

Figure 7A:
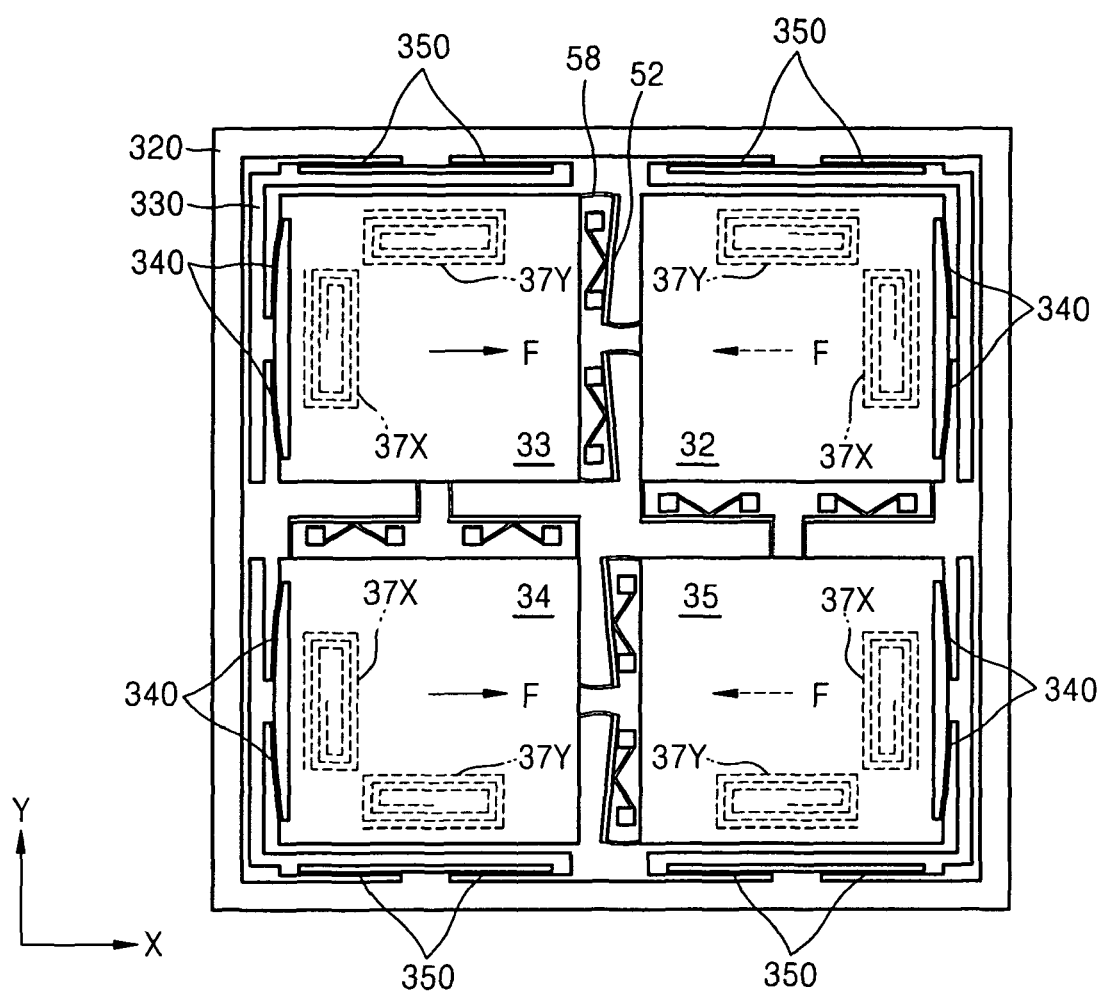
FIGS. 7A through 7C are plan views for explaining operations of the stages of the micro actuator 20, according to exemplary embodiments of the present invention.
Figure 7B:
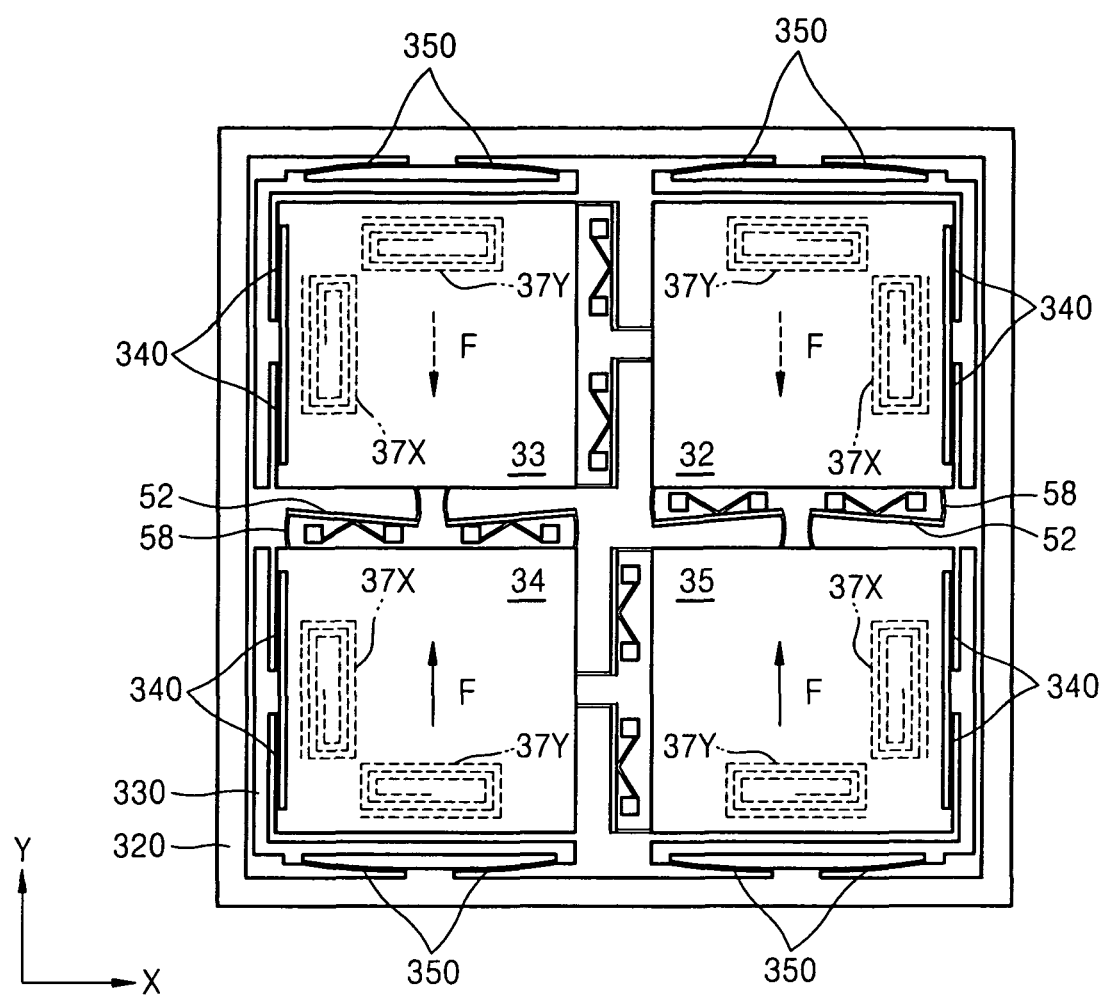
Figure 7C:
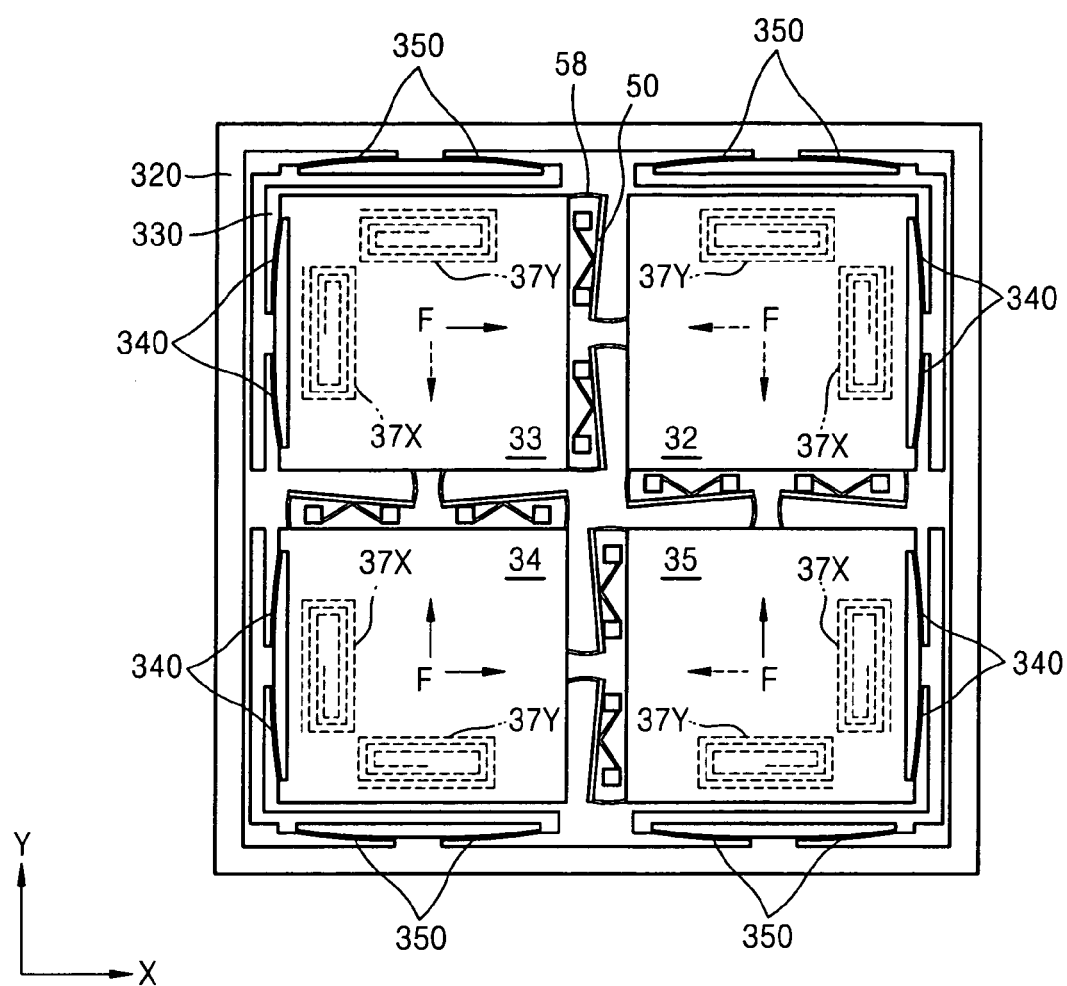

FIGS. 7A through 7C are plan views for explaining operations of the first through fourth stages 32 through 35 of the micro actuator 20, according to an exemplary embodiment of the present invention.

FIG. 7A describes an operation of driving the first through fourth stages 32 through 35 in the X direction. Referring to FIG. 7A, when force F is applied to the second stage 33 and the third stage 34 in the X direction due to the driving of the X-coils 37X disposed in the bottom surfaces thereof, the first elastic beams 340 connected to the second stage 33 and the third stage 34 are deformed in the X direction, and thus the second stage 32 and the third stage 33 are driven in the X direction.

The stiffener 330 is connected to the frame 320 through the second elastic beams 350 having Y directional elasticity, as described above. Since the second elastic beams 350 are elastic with respect to the Y directional force, the second elastic beams 350 are not influenced by the X directional force. Accordingly, the stiffener 330 and the frame 320 support the motions of the first through fourth stages 32 through 35 with respect to the X directional force.

When the second stage 33 and the third stage 34 are driven in a positive X direction, a first end of the operating unit 52 of the lever 50 connecting the second stage 32 and the third stage 33 through the connecting beam 58 is forced in the positive X direction. Accordingly, a second end of the operating unit 52 of the lever 50 connecting the first stage 32 and the fourth stage 35 through the connecting beam 58 is forced in a negative X direction. In addition, the first-elastic beams 340 connected to the first stage 32 and the fourth stage 35 are deformed in the negative X direction, and the first stage 32 and the fourth stage 35 are forced in the negative X direction to be driven.

That is, when the second stage 33 and the third stage 34 are driven in the positive X direction, the first stage 32 and the fourth stage 35 are driven in the negative X direction, and vice versa. When the second stage 33 and the third stage 34 are driven in the X direction, a current may be applied to the X-coils 37X in the first and second stages 32 and 35 in order to drive the first stage 32 and the fourth stage 35 in the negative X direction. In this case, the driving force is doubled.

FIG. 7B describes an operation of driving the first through fourth stages 32 through 35 in the Y direction. Since the operation and principle of the Y directional driving is similar to those of the X directional driving, only the differences therebetween will be described. Since the stiffener 330 is connected to the frame 320 through the second elastic beams 350 having Y directional elasticity, the second elastic beams 350 are elastically deformed in the same direction with respect to the Y directional force, and thus the stiffener 330 is supported by the frame 320 to move. In addition, since the first elastic beams 340 connecting the stiffener 330 and the first through fourth stages 32 through 35 are not elastically deformed with respect to the Y directional force, the first through fourth stages 32 through 35 are not moved with respect to the stiffener 330 by the Y directional force. That is, the first through fourth stages 32 through 35 and the stiffener 330 are supported by the frame 320 to move in the Y direction with respect to the Y directional force.

The operation of the levers 50 is the same. Accordingly, when the third stage 34 and the fourth stage 35 are driven in the positive Y direction, the first stage 32 and the second stage 33 are driven in the negative Y direction, and vice versa. In addition, when the third stage 34 and the fourth stage 35 are driven in the positive Y direction, a current can be supplied to the Y-coils 37Y in the first stage 32 and the second stage 33 in order to the drive the first stage 32 and the second stage 33 in the negative Y direction. In this case, the driving force is doubled.

FIG. 7C describes an operation of simultaneously driving the first through fourth stages 32 through 35 in two directions, according to an exemplary embodiment of the present invention. In the operation, the second stage 33 and the third stage 34 are forced in the X direction by the X-coils 37X disposed on the bottom surfaces thereof, and the third stage 34 and the fourth stage 35 are forced in the Y direction by the Y-coils 37Y disposed on the bottom surfaces thereof. Due to the reactions of the first elastic beams 340, the second elastic beams 350, and the levers 50, the first through fourth stages 32 through 35 are diagonally driven toward the center.

In the above-described structure, when the first through fourth stages 32 through 35 are driven, respective adjacent stages are forced in the opposite direction due to the operation of the levers 50, thereby providing stability in case of an external shock. For example, when an external force in the positive X direction is applied to the first through fourth stages 32 through 35, the force is equally applied to the first through fourth stages 32 through 35. Accordingly, the second stage 33 and the third stage 34 are forced in the negative X direction with respect to the positive X directional force applied to the first stage 32 and fourth stage 35, respectively. In addition, the first stage 32 and the fourth stage 35 are forced in the negative X direction with respect to the positive X directional force applied to the second stage 33 and the third stage. Accordingly, opposite directional forces are simultaneously applied to the first through fourth stages 32 through 35, and thus the influence of the external force is minimized.

Figure 8:
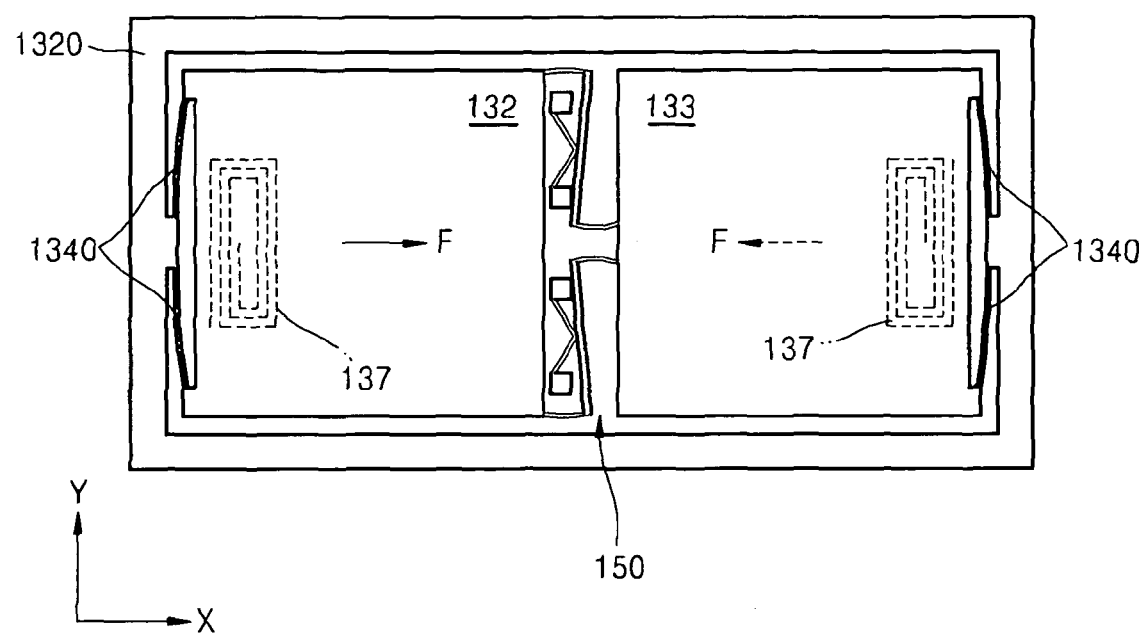
FIG. 8 is a plan view of a stage in a micro actuator according to another exemplary embodiment of the present invention.

FIG. 8 is a plan view of a stage in a micro actuator according to another exemplary embodiment of the present invention. In FIG. 8, stages 132 and 133 are driven in a single direction. Referring to FIG. 8, the stages 132 and 133 are arranged parallel to each other in a direction X, and coils 137 are respectively arranged on the bottom surface of the stages 132 and 133. Levers 150 having the above-described structure are connected between the stages 132 and 133. First elastic beams 1340 elastically deformed in the X direction are connected between a frame 1320 having a rectangular shape and surrounding the stages 132 and 133. In such single-axis driving, a stiffener, which is necessary for two-axis driving, is not necessary.

Figure 9:
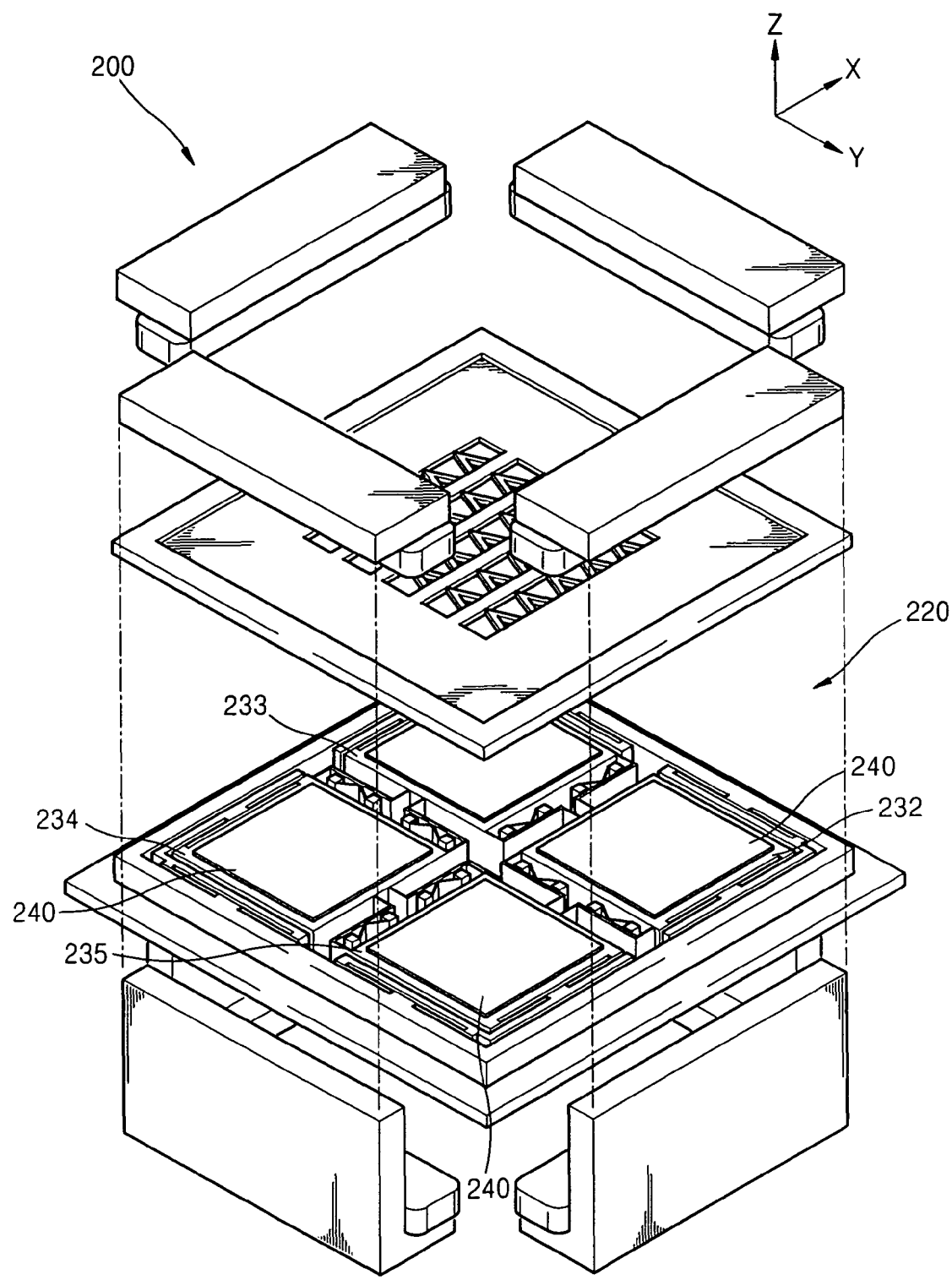
FIG. 9 is a perspective view of a data storage apparatus according to an exemplary embodiment of the present invention.

In addition, the micro actuator according to the current exemplary embodiment of the present invention can be applied to a data storage apparatus. FIG. 9 is a perspective view of a data storage apparatus 200 according to an exemplary embodiment of the present invention. Referring to FIG. 9, the data storage apparatus 200 includes media 240 which store data, a micro actuator 220 having a plurality of stages 231 though 234 in which the media 240 are mounted, and a cantilever tip array arranged in an upper portion of the stages 231 through 234 to store data in the media 240 or to read data from the media 240. The configuration and operation of the micro actuator 220 are the same as the micro actuator 20 according to a previous exemplary embodiment of the present invention.

Hereinafter, a method of manufacturing a micro actuator having separated stages and a structure in which coils are formed on bottom surfaces of the stages will be described.

Figure 10:
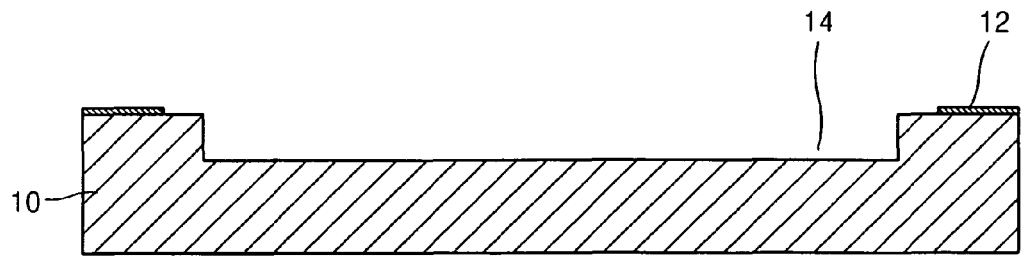
FIG. 10, FIGS. 11A through 11E and FIGS. 12A through 12D are diagrams illustrating a method of fabricating a micro actuator, according to exemplary embodiments of the present invention.

FIGS. 10 through 12 are diagrams illustrating a method of fabricating a micro actuator, according to exemplary embodiments of the present invention.

Referring to FIG. 10, a first electrode unit 12 is formed on a glass substrate 10, and a groove 14 having a predetermined depth and shape is formed in a glass substrate 10.

FIGS. 11A through 11E are diagrams illustrating a manufacturing process of forming a coil 62 and a second electrode unit 64 on a silicon substrate 60, according to an exemplary embodiment of the present invention. The silicon substrate 60 may be a silicon-on-insulator (SOI) substrate having an insulation layer such as an oxide layer 66.

Figure 11A:
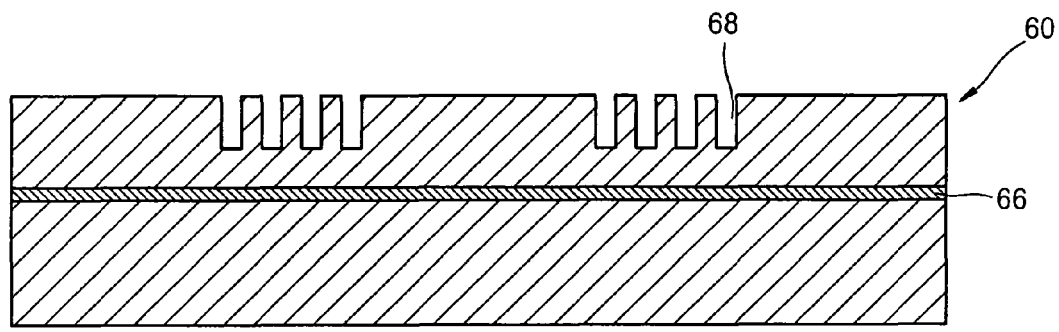

Referring to FIG. 11A, a trench pattern in which the coil 62 will be formed is formed on the silicon substrate 60 using a photolithography process, and then a trench 68 is formed using an inductively coupled plasma-reactive ion etching (ICP-RIE) process.

Figure 11B:
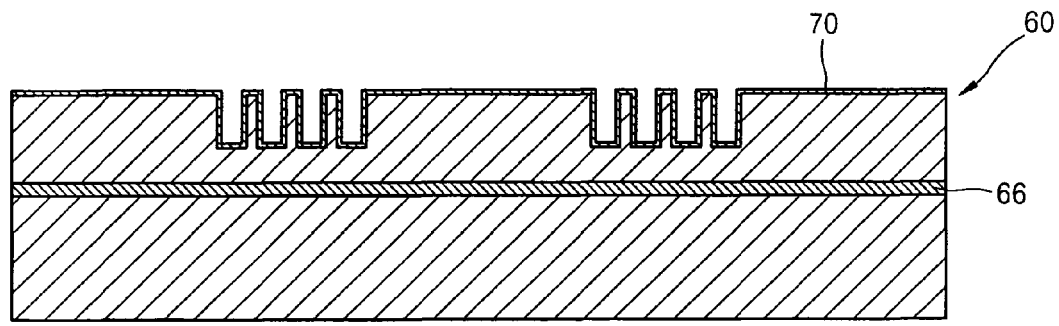

Referring to FIG. 11B, a passivation layer 70 is formed using a thermal oxidation process.

Figure 11C:
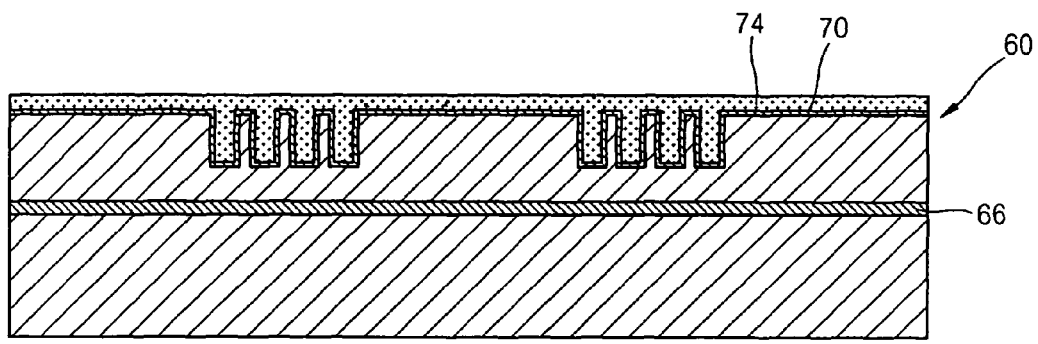
Figure 11D:
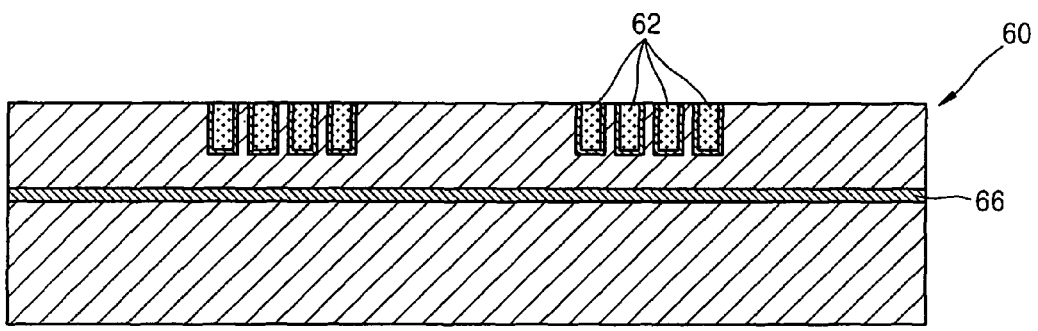

Referring to FIGS. 11C and 11D, the trench 68 is filled with a metal 74 using an electroplating method, and then a plating layer exposed from an upper portion of the trench 68 is polished using a chemical mechanical polishing (CMP) process to form the coil 62.

Figure 11E:
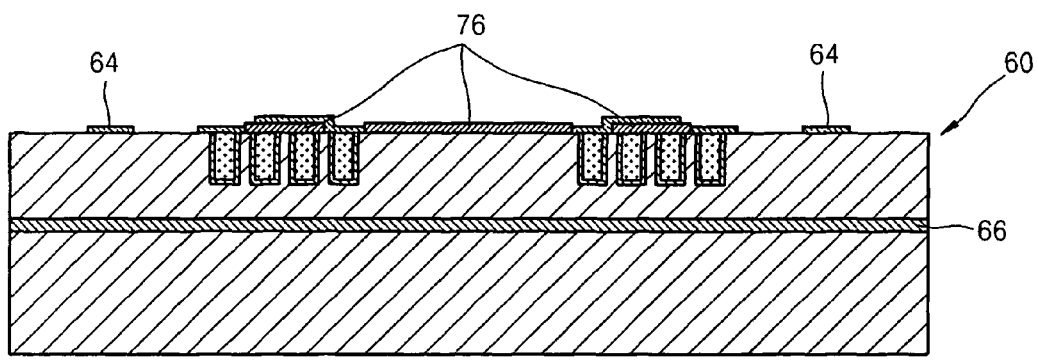

Referring to FIG. 11E, after forming an insulation layer 76, a second electrode unit 64 through which a current is applied to the coil 62 is formed using a metal deposition process.

FIGS. 12A through 12E illustrate a process of bonding the silicon substrate 60 and the glass substrate 10 to form stages, according to an exemplary embodiment of the present invention.

Figure 12A:
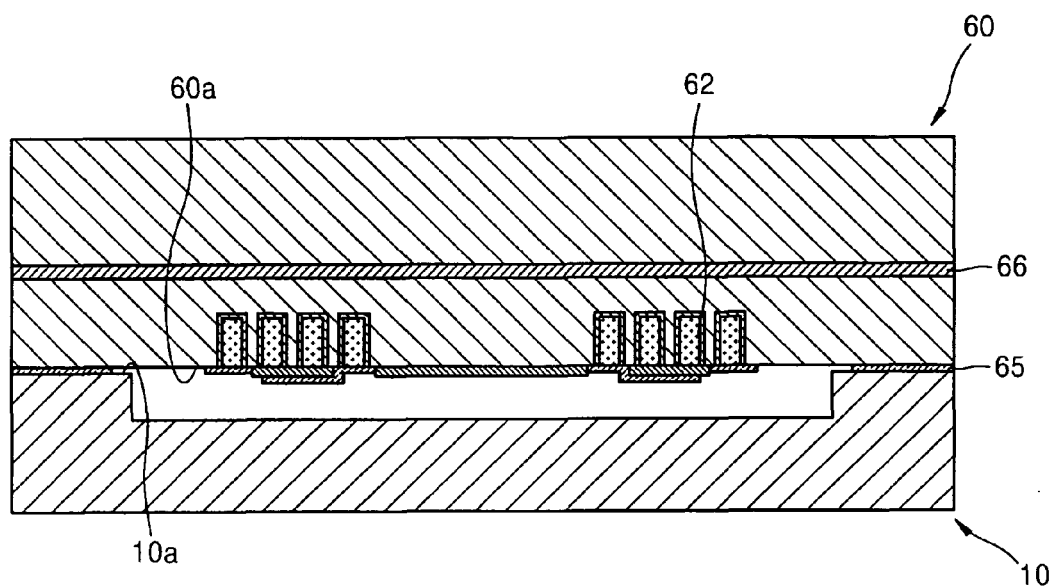

Referring to FIG. 12A, a top surface 60a of the silicon substrate 60 is bonded to a top surface 10a of the glass substrate 10. Here, the first electrode unit 12 (see FIG. 10) and the second electrode unit 64 (see FIG. 11E) contact each other to form electrode pads 65. The electrode pads 65 are exposed by an etching process which will be described later, and thus a current is applied to the coil 62 therethrough.

The bonding is performed using an anodic bonding process in which several hundred volts are applied between the silicon substrate 60 and the glass substrate 10 to increase the temperature to several hundreds of degrees. Accordingly, the potential in the glass/silicon interface is drastically reduced and the silicon substrate 60 and the glass substrate 10 are bonded by the electric field.

Figure 12B:
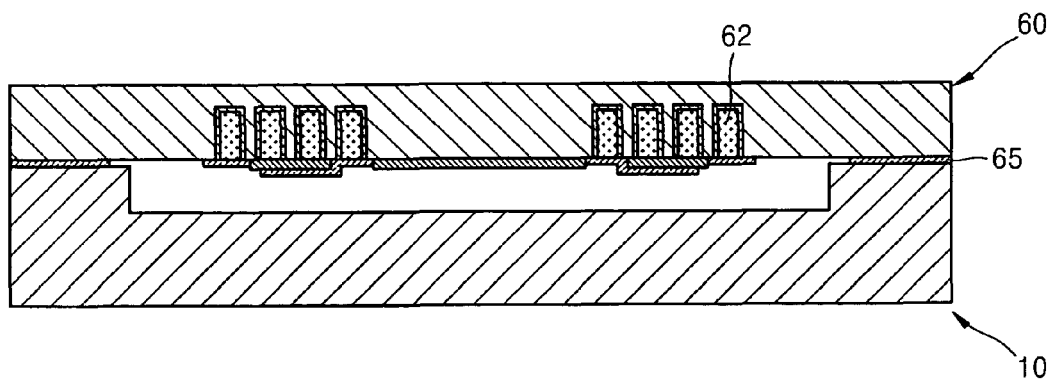

Referring to FIG. 12B, the silicon substrate 60 is entirely etched after the anodic bonding. The thickness of the stages are determined according to the etch depth. When a SOI substrate is used as the silicon substrate 60, the SOI substrate is etched to expose an inner oxide layer 66 (see FIG. 12A), and then the inner oxide layer 66 is etched. In this case, a SOI substrate having a thickness to the inner oxide layer 66 (see FIG. 12A) corresponding to the thickness of the stage to be formed is prepared.

Figure 12C:
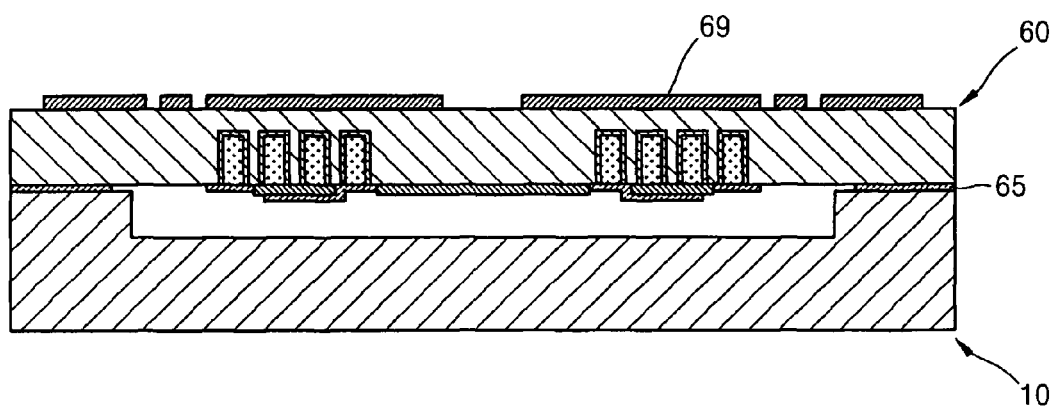

Referring to FIG. 12C, the process is an etching process in which a frame, an elastic beam, stiffeners, separated stages and a lever structure connecting them are formed to move the stage after the entire etching process, and in which electrode pads 65 to apply a current to the coil 62 are exposed. An etch mask 69 may have the plan view of FIG. 2.

Figure 12D:
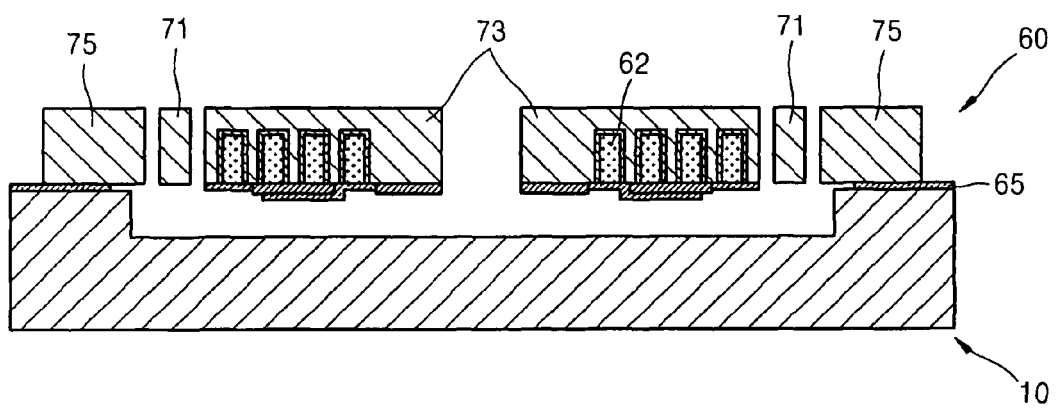

Referring to FIG. 12D, the etch mask 69 is removed after the etching process. A micro actuator which has separated stages 73, a frame 75, stiffeners 71, an elastic beam (not illustrated), and a lever structure and in which the coils 62 are formed on the bottom surface of the stages is manufactured.

The micro actuator and the data storage apparatus employing the same, according to an exemplary embodiment of the present invention, including a plurality of stages having a mass balancing, and having a structure in which the stages are connected through levers and driving coils disposed on bottom surfaces of the stages, have at least the following advantages and more as understood by one of ordinary skill in the art.

First, since the components of the micro actuator are manufactured to have the same shape using the same process, more accurate mass balancing can be provided.

Second, since the driving units are not necessarily separated from the stages, and coils are not manufactured in an assembly process but in a batch process, manufacturing costs thereof are low.

Third, the driving coils are formed on the bottom surfaces of the stages, thereby having high area efficiency While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A micro actuator comprising:
 a supporting unit;
 a plurality of stages that are elastically supported by the supporting unit, each stage having a mounting surface where a target driven body is mounted thereon, and arranged adjacent to each other;
 a plurality of levers which are disposed between the plurality of stages, each lever having two ends respectively connected to adjacent stages, and which apply force to the adjacent stages so that when one of the stages is moved, an adjacent stage is moved in an opposite direction to a moving direction of the one stage; and
 driving units which respectively provide a driving force to the stages.

2. The micro actuator of claim 1, wherein each of the levers comprises:
a fixing unit installed in the supporting unit;
an operating unit having two ends respectively connected to facing sides of adjacent stages; and
a hinge unit that is interposed between the fixing unit and the operating unit and rotatably supports the operating unit.

3. The micro actuator of claim 2, further comprising two fixing units, which are separately installed in the supporting unit, wherein an edge of the hinge unit is connected to a center of the operating unit and has a V-shape structure connecting the two fixing units.

4. The micro actuator of claim 2, further comprising:
connecting beams that are arranged between the two ends of the operating unit and the stages and elastically connect the operating unit and the stage.

5. The micro actuator of claim 1, wherein the supporting unit comprises:
a base;
a frame which is arranged on the base and surrounds the plurality of the stages; and
elastic beams which are disposed between the frame and the stages, and elastically support the stages.

6. The micro actuator of claim 1, wherein the driving unit comprises:
coils respectively formed in the stages; and
a plurality of permanent magnets arranged in positions respectively facing the coils.

7. The micro actuator of claim 6, wherein the coils are arranged on the backside of the mounting surfaces of the stages.

8. The micro actuator of claim 1, wherein the plurality of stages are four stages which are arranged in a two-by-two matrix in a first direction and a second direction perpendicular to the first direction.

9. The micro actuator of claim 8, wherein the supporting unit comprises:
a base;
a frame which is arranged on the base and surrounds the plurality of the stages; and
stiffeners which are respectively disposed between the frame and the stages, wherein the stiffeners comprise first regions disposed parallel to the first direction and second regions disposed parallel to the second direction;
first elastic beams which are respectively connected between the second region and a facing side of the stages, and elastically deformed in the first direction; and
second elastic beams that are respectively connected to the first regions and an inner surface of the frame facing the first regions, and elastically deformed in the second direction.

10. The micro actuator of claim 8, wherein the driving unit comprises:
coils respectively formed in the stages; and
a plurality of permanent magnets arranged in positions respectively facing the coils.

11. The micro actuator of claim 10, wherein the coils comprises:
first coils arranged to respectively provide a moving force to the stages in the first direction; and
second coils arranged to respectively provide a moving force to the stages in the second direction.

12. The micro actuator of claim 10, wherein the coils are arranged on the backside of the mounting surfaces of the stages.

13. A data storage apparatus comprising:
media which store data;
a micro actuator in which the media is mounted, wherein the micro actuator comprises:
a supporting unit,
a plurality of stages that are elastically supported by the supporting unit, each stage having a mounting surface where a target driven body is mounted thereon, and arranged adjacent to each other,
a plurality of levers which are disposed between the plurality of stages, each lever having two ends respectively connected to adjacent stages, and which apply force to the adjacent stages so that when one of the stages is moved, an adjacent stage is moved in an opposite direction to a moving direction of the one stage, and
driving units which respectively provide a driving force to the stages,
wherein the plurality of stages are four stages which are arranged in a two-by-two matrix in a first direction and a second direction perpendicular to the first direction; and
a cantilever tip array arranged in an upper portion of the media in order to store data in the media or read data from the media.

14. The data storage apparatus of claim 13, wherein the driving unit comprises:
coils respectively formed on the mounting surfaces of the stages; and
a plurality of permanent magnets arranged in positions respectively facing the coils.

* * * * *